(12) United States Patent
Saegesser et al.

(10) Patent No.: US 7,430,807 B2
(45) Date of Patent: Oct. 7, 2008

(54) UNIVERSAL SAW

(75) Inventors: Daniel Saegesser, Langenthal (CH); Sacha Felder, Langendorf (CH)

(73) Assignee: Robert Bosch GmbH, Stuttgart (DE)

( * ) Notice: Subject to any disclaimer, the term of this patent is extended or adjusted under 35 U.S.C. 154(b) by 157 days.

(21) Appl. No.: 10/555,976

(22) PCT Filed: Apr. 8, 2005

(86) PCT No.: PCT/EP2005/051562

§ 371 (c)(1), (2), (4) Date: Nov. 8, 2005

(87) PCT Pub. No.: WO2005/110652

PCT Pub. Date: Nov. 24, 2005

(65) Prior Publication Data

US 2006/0260140 A1  Nov. 23, 2006

(30) Foreign Application Priority Data

May 15, 2004  (DE)  ........................ 10 2004 024 280

(51) Int. Cl.
  *B23D 49/00* (2006.01)
  *B25F 3/00* (2006.01)
(52) U.S. Cl. ............................. 30/122; 30/519; 30/392; 30/275
(58) Field of Classification Search .................... 30/122, 30/272.1, 273, 275, 277.4, 392, 394, 517, 30/519
See application file for complete search history.

(56) References Cited

U.S. PATENT DOCUMENTS

| 2,998,830 | A | | 9/1961 | Atkinson |
| 3,750,283 | A | | 8/1973 | Hoffman |
| 4,033,035 | A | * | 7/1977 | Trimmer ....................... 30/122 |
| 5,193,281 | A | * | 3/1993 | Kasten ......................... 30/394 |
| 5,644,845 | A | * | 7/1997 | Durr et al. .................... 30/376 |
| 5,855,070 | A | * | 1/1999 | Grabowski ................... 30/376 |
| 6,317,988 | B1 | * | 11/2001 | Tachibana et al. ............. 30/376 |
| 6,820,339 | B2 | * | 11/2004 | Albrightson ................. 30/392 |
| 2003/0110646 | A1 | * | 6/2003 | Phillips et al. ................ 30/392 |

OTHER PUBLICATIONS

Westfalia 59 71 87 (With Certified English Translation). Admitted Prior Art.

* cited by examiner

*Primary Examiner*—Timothy V Eley
(74) *Attorney, Agent, or Firm*—Michael J. Striker

(57) ABSTRACT

A universal saw capable of being employed as a jigsaw or sabre saw, having a housing containing a drive train that includes an electric drive motor and a motion converter that converts the rotary motion of the drive motor into a reciprocating working motion of the saw blade movably guided in the housing, and having a wear-resistant base plate for supporting the universal saw on the work piece to be machined can be adapted with particular ease to the optimally desired intended use as a jigsaw or as a sabre saw in that on the one hand, the base plate (21) can be rigidly locked in a definite, first operating position in relation to the housing of the universal saw (10) in which position, the direction of the working movement of the saw blade (14, 15) is perpendicular to the plane of the base plate (21) and on the other hand, outside of this operating position, the base plate (21) can be variably adjusted in its angular position in relation to the direction of the working movement.

11 Claims, 4 Drawing Sheets

UNIVERSAL SAW

PRIOR ART

Figure 1:
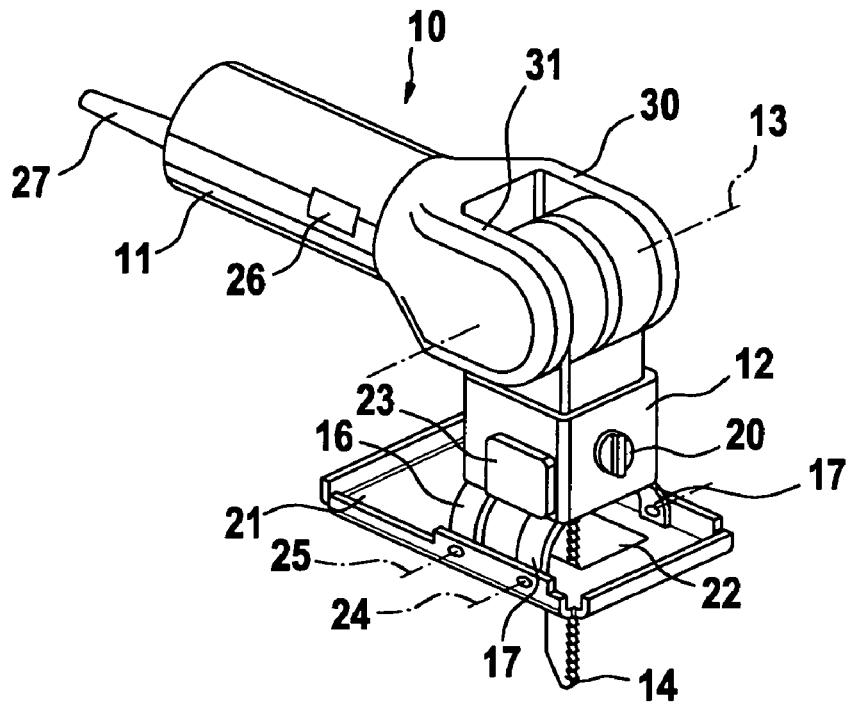

The present invention is based on a universal saw according to the preamble to claim 1.

A known multi-saw, the Westfalia 59 71 87, can be employed as an electric all-purpose saw, jigsaw, or sabre saw. In this multi-saw, the part of its housing at which the saw blade—which is adapted to the intended use—emerges from the interior through a wide housing slot is itself embodied as a device for supporting the saw on the work piece to be machined. This embodiment naturally does not provide an optimal adaptation of the support device to the intended use. In addition, the housing of the multi-saw, which is made of plastic, is naturally subjected to an increased wear in heavy duty operation, particularly in the region in which it rests on the work piece, which further decreases the quality of the support.

In power saws that are intended for only one use, e.g. a jigsaw or sabre saw, it is also known for the saw-supporting device to be embodied in the form of a separate component, namely a base plate. This permits the base plate and its spatial orientation on the housing of the saw to be optimally selected: in a jigsaw, in order to achieve the best sawing results, it is necessary to orient the base plate precisely at a right angle in relation to the saw blade and in relation to its tool movement direction. By contrast, in a sabre saw or an electric all-purpose saw, the best sawing results are achieved when the base plate is arranged on the housing of the saw in pivoting fashion and is thus able to flexibly adapt itself to the shape of the work piece to be machined.

ADVANTAGES OF THE INVENTION

Taking the above-described disadvantages of the prior art as a point of departure, the defining characteristics of claim 1 provide a universal saw that can be employed as a jigsaw or sabre saw equipped with a wear-resistant base plate whose position and spatial orientation in relation to the saw blade and in relation to the work piece to be machined can be easily adapted to the intended use as a jigsaw or sabre saw by means of a simple adjustment.

A particularly suitable embodiment of the universal saw is achieved if the base plate is linked to the housing by means of two parallel pivot axes that are preferably spaced the same distance apart from the plane of the base plate and in which the distance of one of the pivot axes from the housing, measured parallel to the working movement of the saw blade, is constant while the distance of the other pivot axis can be variably adjusted and locked in position in a definite, first operating position in which the two distances are equal.

Although it is in fact possible for the defining characteristics of the present invention to be used in various universal saws known from the prior art that can be employed as jigsaws or sabre saws, thus achieving the technical advance described herein, the invention can be implemented to particular advantage in a universal saw in which the housing is comprised of multiple parts including a partial housing that contains the drive motor and simultaneously serves as a handle of the universal saw and a main housing part in which the saw blade is guided; it is possible to lock the housing parts in various angular positions in relation to each other around a folding axis extending at right angles to the axis of the drive motor and the drive train includes an angle transmission.

Other advantageous embodiments of the invention ensue from the defining characteristics of the claims, are explained in the specification, and are shown in the drawings.

DRAWINGS

Exemplary embodiments of the present invention are explained in the description below in conjunction with the accompanying drawings.

Figure 2:
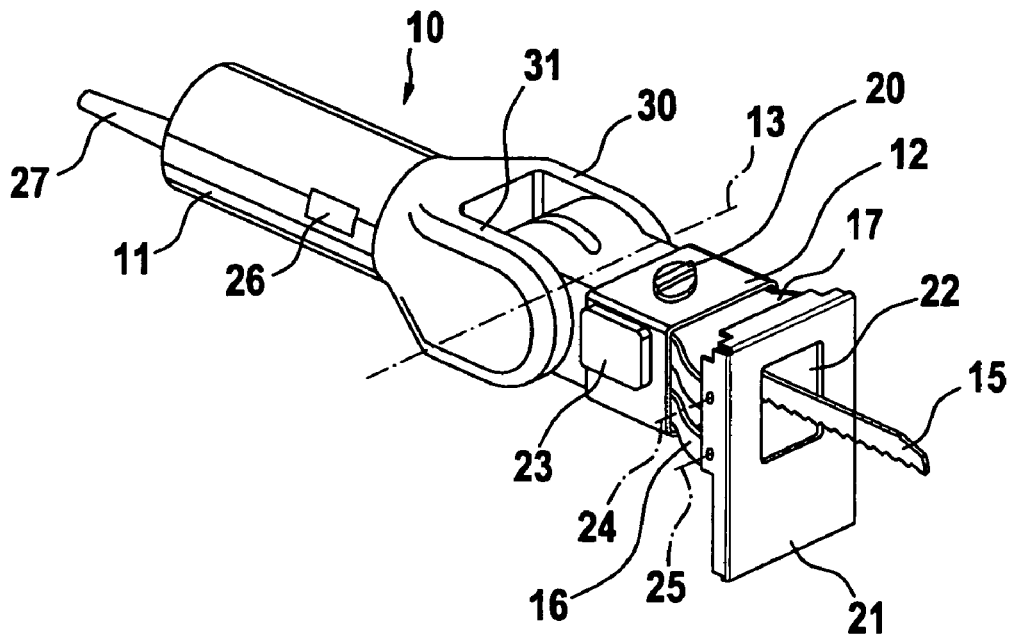
Figure 3:
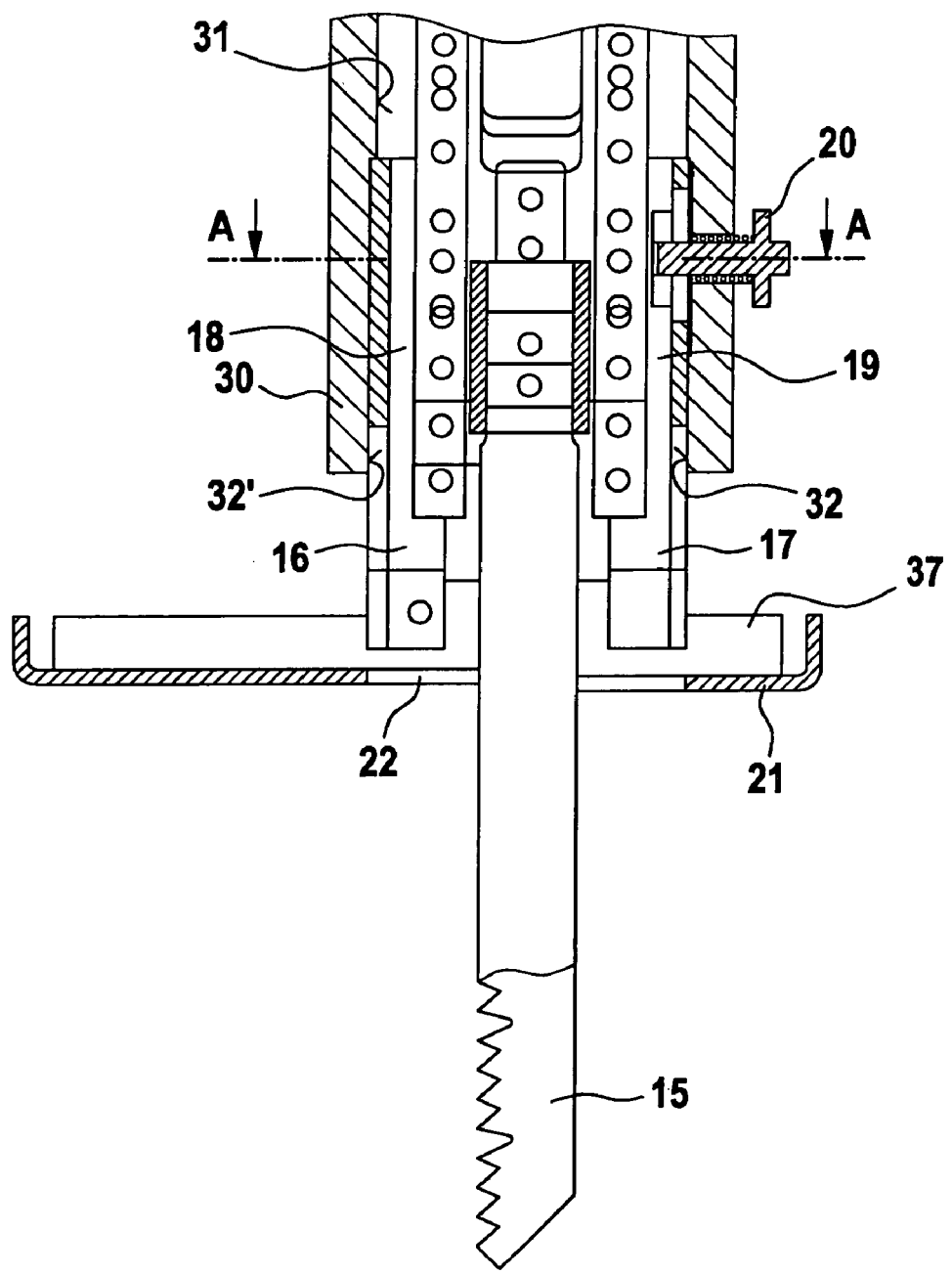
Figure 4:
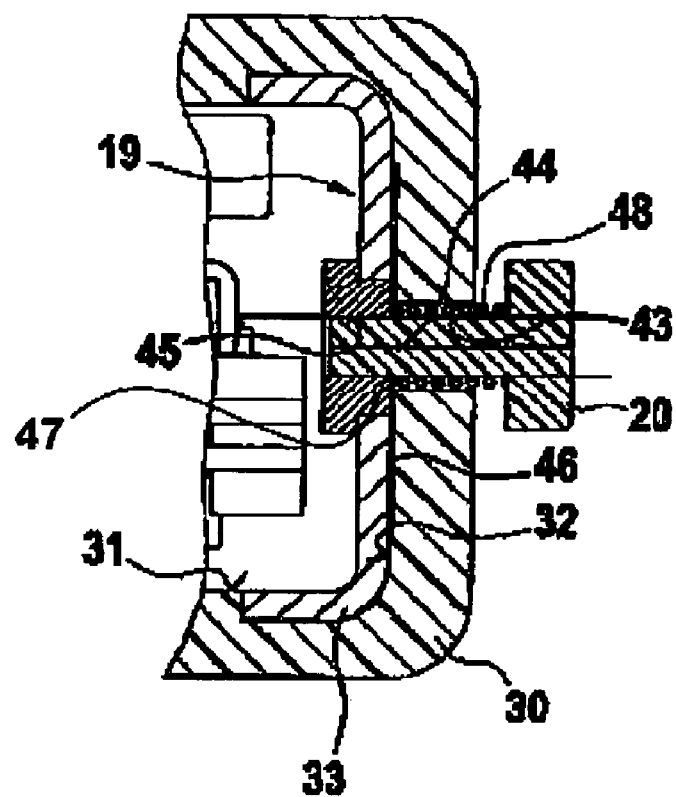
Figure 5:
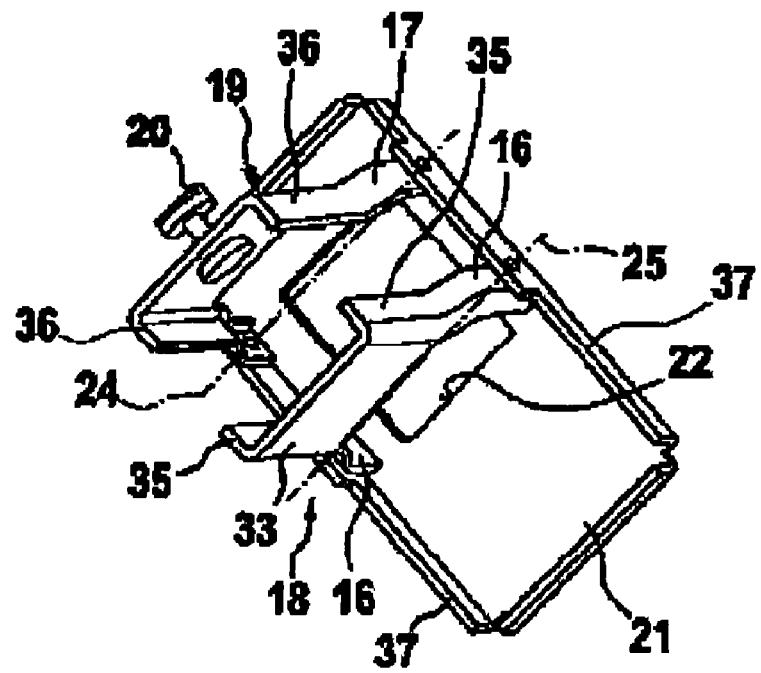
Figure 6:
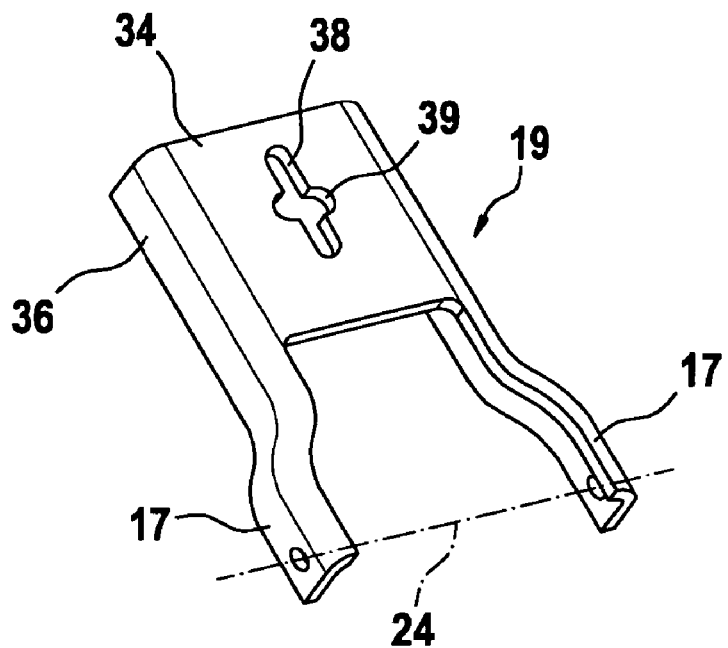
Figure 7:
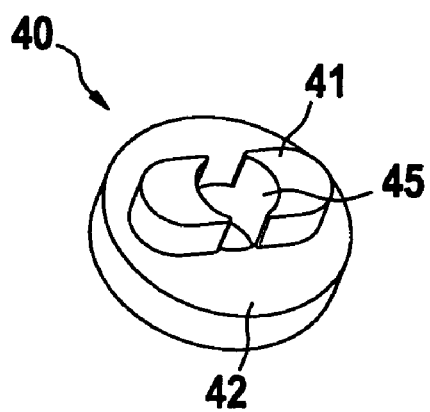

FIG. 1 shows a universal saw embodied according to the present invention, having a housing comprised of two parts in which the two parts of the housing are situated at a 90° angle to each other in the form of a straight jigsaw, FIG. 2 shows the same universal saw in an extended 180° position of the housing parts in the form of a sabre saw, FIG. 3 a partial section through the housing base body of the universal saw, along the central plane of the saw blade, FIG. 4 shows a sectional view along the line A-A in FIG. 3, FIG. 5 is a perspective, detailed view of the base plate of the universal saw, with a retaining bracket and an adjusting bracket, FIG. 6 shows an enlarged detail of the adjusting bracket, and FIG. 7 shows the guide piece of the securing mechanism for the adjusting bracket of the base plate in the housing of the universal saw.

DESCRIPTION OF THE EXEMPLARY EMBODIMENTS

A universal saw 10 shown in FIG. 1 and FIG. 2 has a housing comprised essentially of two housing parts—a housing part 11 and a housing base body 12. The housing part 11 can be adjusted in its angular position around a folding axis 13 in relation to the housing base body 12. FIG. 1 shows the universal saw 10 in a position in which it functions as a straight jigsaw in that the housing part 11 and the housing base body 12 in which a tool is guided—in this case a conventional saw blade 14 for jigsaws—are situated at a 90° angle to each other. FIG. 2 shows the same universal saw in an extended 180° position in which it can be employed as a sabre saw. In this intended use, a conventional sabre saw blade 15 is mounted in the housing base body 12. In this second intended use, the saw blade is used in an orientation that is rotated by 180° in relation to the intended use described above.

A clamping system for the saw blades, which is situated inside the housing base body 12 and is shown in the drawing in FIG. 3, makes it possible to use saw blades 14 or 15 that are adapted to the respective sawing mode—either as a jigsaw for particularly fine work or as a sabre saw for rougher work. This clamping system is able to clamp both the special insertion ends of jigsaw blades 14 and those of sabre saw blades 15 in two positions that are rotated by 180° in relation to each other. An operating lever 23 for operating the clamping system is situated at the free end of the housing base body 12.

On the underside of the housing base body 12, which is oriented toward the work piece to be machined and from which the saw blade 14, 15 protrudes, there is a base plate 21 (also see FIG. 5), which extends in an essentially normal orientation in relation to the working movement direction of the saw blade 14, 15 and serves to support the tool on the work piece—not shown here. The base plate 21 has an opening 22 through which the saw blade 14, 15 extends. In order to bring the base plate into the optimum position in relation to the work piece, e.g. for sabre saw operation, it can be moved out of its normal position into various angular positions and can be clamped there as needed—as described further below.

As is evident from FIGS. 1 and 2, holding columns 16, 17 support the base plate 21 in rotating fashion on pivot axes 24, 25 in the housing of the universal saw, or more precisely stated, in the housing base body 12 in this case. Each pair of holding columns 16, 17 is embodied as the fork-like extensions of a U-shaped component (FIGS. 5 and 6). Each of these components is guided in a form-fitting, e.g. trough-shaped supporting bed (FIG. 4) on the interior of the housing base body 12 of the universal saw. The component with the holding columns 17 is embodied in the form of a retaining bracket 18, which is clamped in an intrinsically known manner not described in greater detail here in a stationary fashion in the associated supporting bed. The component with the holding columns 16 is embodied in the form of an adjusting bracket 19, which is secured in the associated supporting bed with a securing mechanism described in greater detail below in conjunction with FIG. 3. The securing mechanism can be actuated by means of an adjusting knob 20 accessible from the outside of the housing base body 12. As is evident from FIGS. 1 and 2, the housing part 11 serves as a handle of the universal saw, which the craftsman operating the hand-guided power tool uses to hold and guide the universal saw. At the same time, the housing part 11 accommodates an electric drive motor for the universal saw, whose power supply cable 27 is situated at the free end of the essentially cylindrical housing part 11.

As mentioned above, the housing parts 11, 12 can be adjusted in terms of their angle in relation to each other around the folding axis 13, but must be locked in relation to each other in order to assure reliable function. This occurs by means of an angle locking device not described in detail here, which can be operated by means of an operating knob accommodated on the outside of the housing part 11, which in this instance is embodied as a slider 26 that can be moved along a surface line of the cylindrical housing part 11. The slider 26 can be moved out of the locked position counter to the force of a spring, not shown here, thus making it possible to adjust the angle of the housing parts 11 in relation to each other.

On the side of the housing part 11 not visible in FIGS. 1 and 2, there is a power switch for the power supply to the drive motor.

FIGS. 3 and 4 show enlarged sections through the housing base body 12 of the universal saw. FIG. 3 shows a depiction along the intersecting plane extending through the central plane of the saw blade 15 in FIG. 2, while the intersecting plane in FIG. 4 is situated along the line A-A in FIG. 3.

The housing base body 12 has an outer housing casing 30 that is comprised in an intrinsically known manner, for example, of a plastic suitable for manufacturing power tool housings. The inner wall 31 of the housing casing 30 is provided with two trough-like supporting beds 32 situated diametrically opposite from each other, into each of which one of the above-mentioned U-shaped components—the retaining bracket 18 or the adjusting bracket 19—is slid in the direction of the reciprocating working motion of the saw blade 14 or 15.

The saw blade 15 is situated in the middle between the adjusting bracket 19 and the retaining bracket 18, with its insertion end secured in the above-mentioned clamping system. The clamping system is coupled to the drive unit by means of a motion converter that is not shown here and is embodied for example in the form of a connecting-rod drive, which converts the rotary motion of the drive motor into the reciprocating motion of the saw blade 14, 15. As is also clear from FIG. 3, the clamping system is guided on intrinsically known guide rails inside the housing 30 of the housing base body 12.

For clearer comprehension, FIGS. 5 and 6 show perspective detailed views of the retaining bracket 18 and adjusting bracket 19 components.

Each of the two components 18, 19 has a flat base plate 33, 34 with legs 35, 36 on both sides that are bent up from it to form a U-shape.

At the end of the base plates 33 and 34 situated at the bottom in the installed state (FIG. 3), the legs 35 and 36 transition into the holding columns 16 and 17. The pivot axis 25 extends through the free ends of the holding columns 16 and correspondingly, the pivot axis 24 extends through the free ends of the holding columns 17; the points at which they pass through constitute the rotation points at which the base plate 21 is pivotably fastened at its flanged edges 37 that are bent upward at the sides. Correspondingly, there is also an attachment of the base plate 21 to the holding columns 16 at the pivot axis 25 that permits a pivoting movement.

FIGS. 3 and 4 show the base plate 21 in its final, installed position.

Whereas the retaining bracket 18—as mentioned above— is clamped in its associated supporting bed 32' (FIG. 3) in stationary fashion, the adjusting bracket 19 is secured in its associated supporting bed 32 by means of a securing mechanism that will be described below.

The securing mechanism is comprised of two slots 38, 39 that cross each other at right angles (FIG. 6) in the base plate 34 of the adjusting bracket 19. The longer slot 38 extends in the middle of its base plate 34, parallel to the sliding direction of the adjusting bracket 19 when it is installed inside the housing casing 30. The shorter slot 39 crosses the slot 38 at right angles in the middle of its longitudinal span. The two slots 38, 39 each have the same width.

In the installed state (FIGS. 3, 4) a guide piece 40 shown as a detail in FIG. 7 engages with its detent projection 41 in sliding block fashion in one of the slots 38, 39, depending on its angular position. The guide piece 40 has the shape of a flat, circular disk 42 with the detent projection 41 protruding up from it symmetrically in the middle. In its outline, the shape of the detent projection 41 corresponds in width and length to the shape of the shorter slot 39, except for a slight amount of movement play.

The guide piece 40 rests snugly against the inner end of a shaft 44 guided in a bore 43 of the housing casing 30 of the housing base body 12. To accomplish this, the inner end of the shaft 44 is mounted in a fastening bore in the middle of the guide piece 40 so that is secured against relative rotation in a manner that is not described in detail here, but is intrinsically known—for example by means of being press-fitted into it.

As is particularly clear from FIG. 4, a rectangular, flat glide plate 46 whose longitudinal and lateral spans correspond to the lengths of the long slot 38 and the short slot 39 rests against the flat outside of the base plate 34, between it and the associated base of the supporting bed 32. The glide plate 46 has a through bore 47 in the middle. The through bore 47 has a smaller diameter than the bore 43 in the wall of the housing casing 30. The shaft 44 extends through the through bore 47.

A compression spring 48, which rests against the side of the glide plate 46 oriented away from the base plate 34, is situated concentrically on the shaft 44 and extends through the bore 43 in the wall of the housing casing 30. At its other end, the compression spring 48 rests against the inner surface of the adjusting knob 20 formed onto the end of the shaft 44 protruding out from the housing casing 30 of the housing base body 12.

The compression spring 48 holds the detent projection 41 on the guide piece 40 so that in every operating position of the universal saw, the guide piece 40 engages in sliding block fashion either in the short slot 39 or the long slot 38, depending on its angular position. Manual pressure on the adjusting knob 20 disengages the detent projection 41 from the respective slot 38 or 39 counter to the force of the compression spring 48. By simply rotating the adjusting knob 20 by 90°, the detent projection 41 can be disengaged from the one slot and moved into the other possible engagement position with the other slot.

In a first, definite operating position, the detent projection 41 engages in a form-locked manner with the slot 39 extending transversely in relation to the working movement of the saw blade 14, 15 as a result of which the adjusting bracket 19 is also rigidly locked in relation to the housing, i.e. in this case with the housing base body 12 of the universal saw. In this definite operating position, the direction of the working movement of the saw blade 14, 15 is precisely perpendicular to the plane of the base plate 21. In this position, therefore, the universal saw can be employed as a jigsaw (FIG. 1).

In any other operating position outside of this first, definite operating position, the detent projection 41 engages with the slot 38 extending parallel to the working direction of the saw blade 14, 15. But since its length is a significantly longer than that of detent projection 41, the adjusting bracket 19 held against the glide plate 46 by compression spring 48 can be moved in opposition to the frictional engagement between the base plate 34 of the adjusting bracket 19 and the glide plate 46.

For its part, the glide plate 46 is secured in a stationary fashion by the shaft 44, which is guided in the bore 43 of the housing casing 30 and in turn passes through the through bore 47 in the glide plate 46. The stress of the compression spring 48 determines the magnitude of the frictional engagement.

The above-described mobility of the adjusting bracket 19, which is limited by the length of the slot 38, makes it possible to variably change distance of the pivot axis 24 from the housing of the universal saw or more precisely stated, from the housing base body 12. Since the analogous distance of the pivot axis 25 is unalterably fixed, this permits a corresponding, variable change in the angular position of the plane of the base plate 21 in relation to the working movement of the saw blade 14, 15 to occur. Now the universal saw can be employed as a sabre saw (FIG. 2).

It should also be noted in this context that when being employed as a sabre saw, it is advantageous to clamp the saw blade 15 so that the pivot axis 25 is situated in front of the side of the saw blade 15 with the saw teeth and the pivot axis 24 is situated in front of the back of the saw blade 15, as shown in FIGS. 2 and 3.

The above-described base plate 21 according to the present invention, together with its attachment to the housing of the universal saw can be used with practically any housing design of the universal saw. However, very particular advantages can be achieved if—as in the exemplary embodiment described here—the housing of the universal saw, thanks to its two-part design, can be adapted to a very special degree to the intended use as a jigsaw or as a sabre saw.

What is claimed is:

1. A universal saw capable of being employed as a jigsaw or sabre saw, having a housing and a base plate (21) for supporting the universal saw on a work piece to be machined wherein:
the housing contains a drive train that includes an electric drive motor and a motion converter that converts a rotary motion of the drive motor into a reciprocating working motion of a saw blade movably guided in the housing, and the base plate for supporting the universal saw on the work piece to be machined is linked to the housing (12) by means of two parallel pivot axes (24, 25) and a distance of one of the pivot axes (25) from the housing (12), measured parallel to the reciprocating working motion of the saw blade (14,15), is constant, while a distance of the other pivot axis (24) is variably adjustable, but also is lockable in a definite, first operating position in which the two distances are equal;

when being employed as a saber saw, the base plate is arranged on the housing in a pivoting fashion wherein the pivot axis (25) that is spaced the constant distance apart from the housing (12) is situated in front of the saw blade (15), and the other pivot axis (24) with the variably adjustable distance from the housing (12) is situated behind the saw blade (15) and wherein:

on the one hand, the base plate (21) is rapidly lockable in the definite, first operating position in relation to the housing of the universal saw (10) in which position, the direction of the reciprocating working motion of the saw blade (14, 15) is perpendicular to the base plate (21) and on the other hand, it is possible outside of this operating position, to variably adjust the angular position of the base plate (21) in relation to the direction of the reciprocating working motion of the saw blade.

2. The universal saw as recited in claim 1, wherein the pivot axes (24, 25) are spaced the same distance from a plane of the base plate (21).

3. The universal saw as recited in claim 1, wherein the pivot axes (24, 25) of the base plate (21) are supported in holding columns (16, 17) that are supported in the housing (12).

4. The universal saw as recited in claim 3, wherein the holding columns (16, 17) supporting a common pivot axis (24, 25) are fork-like extensions of a U-shaped component (33, 34) with a flat base plate, each of these components (33, 34) being guided in an associated form-fitting, preferably trough-shaped supporting bed (32, 32') in the housing (12) of the universal saw.

5. The universal saw as recited in claim 4, wherein the component equipped with the holding columns (16) supporting the first pivot axis (25) is embodied as a U-shaped retaining bracket (18), which is clamped in stationary fashion in the associated supporting bed (32') of the housing (12) of the universal saw, and the component equipped with the holding columns (17) supporting the other pivot axis (24) is embodied as a U-shaped adjusting bracket (19), which a securing mechanism locks in place in the first, definite operating position in the housing (12) of the universal saw, in particular by means of form-locked engagement, while in all other operating positions apart from the first operating position, the adjusting bracket (19) is guided in sliding fashion in the associated supporting bed (32) and is preferably secured by means of frictional engagement.

6. The universal saw as recited in claim 5, wherein the securing mechanism on the adjusting bracket (19), preferably in the middle of its flat base plate (34), has two slots (38, 39) of equal widths and unequal lengths that cross each other, the longer of which (38) extends parallel to the sliding direction of the adjusting bracket (19) and the shorter of which (39) extends parallel to the sliding direction of the adjusting bracket (19) and the shorter of which (39) extends at right angles thereto; an externally actuatable guide piece (40), which is rotatably supported in the housing (12) of the universal saw, engages in spring-loaded sliding block fashion in one of the slots (38, 39).

7. The universal saw as recited in claim 6, wherein the guide piece (40) is comprised of a preferably circular, flat disk

(42) that is securely supported on the inner end of a shaft (44), which is supported in a bore (43) in the wall (31) of the housing (12) of the universal saw and guided by means of the slots (38, 39), which disk is equipped with a symmetrical detent projection (41) that extends in the direction of the shaft (44) and whose outer shape corresponds in width and length to the shape of the shorter slot (39).

8. The universal saw as recited in claim 7, wherein an in particular flat glide plate (46), whose shape is adapted to the outside of the flat base plate (34) and to the outside of the associated supporting bed (32) in the housing (30) of the universal saw, rests against the flat base plate (34) of the adjusting bracket (19) and has a through bore (47) in the middle for the shaft (44); a compression spring (48) rests between the glide plate (46) and an adjusting knob (20) supported on shaft (44) protruding from the housing (12), and thus keeps the detent projection (41) engaged with one of the slots (38, 39) in the operating positions.

9. The universal saw as recited in claim 8, wherein the glide plate (46) is embodied as rectangular and, at least in the longitudinal and transverse directions, corresponds to the lengths of the longer slot (38) and the shorter slot (39).

10. The universal saw as recited in claim 1, wherein the housing is composed of multiple parts, including a housing part (11) that accommodates the drive motor and simultaneously serves as a handle of the universal saw and a main housing part (12) in which the saw blade (14, 15) is guided; it is possible to lock the housing parts (11, 12) in various angular positions in relation to each other around a folding axis (13) oriented at right angles in relation to the axis of the drive motor and the drive train includes an angle transmission having an output axle.

11. The universal saw as recited in claim 10, wherein the motion converter comprises an input member and the folding axis (13), the output axle of the angle transmission, and the axis of the input member of the motion converter all coincide.

* * * * *